US012670713B2

(12) United States Patent (10) Patent No.: US 12,670,713 B2
Aminaka et al. (45) Date of Patent: Jun. 30, 2026

(54) INFORMATION PROVIDING SYSTEM, INFORMATION PROVIDING METHOD AND PROGRAM RECORDING MEDIUM

(71) Applicant: NEC Corporation, Tokyo (JP)

(72) Inventors: Hiroaki Aminaka, Tokyo (JP); Tetsuro Hasegawa, Tokyo (JP); Kosei Kobayashi, Tokyo (JP); Kei Yanagisawa, Tokyo (JP); Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 352 days.

(21) Appl. No.: 18/282,827

(22) PCT Filed: Mar. 22, 2021

(86) PCT No.: PCT/JP2021/011579
§ 371 (c)(1),
(2) Date: Sep. 19, 2023

(87) PCT Pub. No.: WO2022/201215
PCT Pub. Date: Sep. 29, 2022

(65) Prior Publication Data
US 2024/0169723 A1     May 23, 2024

(51) Int. Cl.
*G06V 20/00* (2022.01)
*G06Q 50/40* (2024.01)
(Continued)

(52) U.S. Cl.
CPC ............. *G06V 20/39* (2022.01); *G06Q 50/40* (2024.01); *G06V 20/46* (2022.01); *G06V 40/103* (2022.01); *G06V 2201/07* (2022.01)

(58) Field of Classification Search
CPC ...... G06V 20/39; G06V 20/46; G06V 40/103; G06V 2201/07; G06V 20/52; G06V 20/64;
(Continued)

(56) References Cited

U.S. PATENT DOCUMENTS 8,880,601 B2    11/2014  Boskovic
10,620,010 B2    4/2020  Erez et al.
(Continued)

FOREIGN PATENT DOCUMENTS

JP        2012-014482 A      1/2012
JP        2016-218895 A      12/2016
(Continued)

OTHER PUBLICATIONS

Kim, Seong-Woo et al. "Autonomous Campus Mobility Services Using Driverless Taxi", Sep. 19, 2017, pp. 3513-3526. Retrieved from IEEE Xplore: <URL: https://ieeexplore.ieee.org/document/8046136>. (Year: 2017).*
(Continued)

*Primary Examiner* — Matthew C Bella
*Assistant Examiner* — Nicholas John Helco
(74) *Attorney, Agent, or Firm* — Sughrue Mion, PLLC

(57) ABSTRACT

An information providing system comprises detection means detecting an evaluation target person who is a potential user of a public transportation based on image input from a camera; evaluation means calculating at least one of a first evaluation value indicating a possibility of use of public transportation by the evaluation target person and a second evaluation value indicating a possibility of use of an alternative transportation by the evaluation target person based on a timetable of a public transportation geographically nearest to current location of the evaluation target person; and transmission means transmitting at least one of the first
(Continued)

evaluation value and the second evaluation value to a predetermined terminal apparatus.

12 Claims, 8 Drawing Sheets

(51) Int. Cl.
*G06V 20/40* (2022.01)
*G06V 40/10* (2022.01)

(58) Field of Classification Search
CPC ...... G06V 20/70; G06V 20/10; G06V 20/176; G06V 20/182; G06V 20/38; G06V 40/10; G06V 40/20; G06Q 50/40; G06Q 50/10; G01C 21/26; G01C 21/34; G06T 7/00; G08G 1/005; G08G 1/123; G08G 1/0968; G05D 2107/17
See application file for complete search history.

(56) References Cited

U.S. PATENT DOCUMENTS

| | | | |
|---|---|---|---|
| 11,313,687 B2 | 4/2022 | Erez et al. | |
| 11,821,737 B2 | 11/2023 | Erez et al. | |
| 2002/0111146 A1* | 8/2002 | Fridman | B60Q 1/2611 |
| | | | 455/99 |
| 2009/0287408 A1 | 11/2009 | Gerdes et al. | |
| 2012/0290652 A1 | 11/2012 | Boskovic | |
| 2016/0231129 A1 | 8/2016 | Erez et al. | |
| 2020/0020232 A1* | 1/2020 | Luomi | H04W 4/025 |
| 2020/0240797 A1 | 7/2020 | Erez et al. | |
| 2022/0252408 A1 | 8/2022 | Erez et al. | |
| 2022/0301430 A1* | 9/2022 | Sudo | H04N 7/183 |
| 2024/0177612 A1* | 5/2024 | Watari | G01W 1/10 |

FOREIGN PATENT DOCUMENTS

| | | |
|---|---|---|
| JP | 2017-020853 A | 1/2017 |
| JP | 2018-510330 A | 4/2018 |
| JP | 2019-016150 A | 1/2019 |
| JP | 2019-215629 A | 12/2019 |
| JP | 2021-033868 A | 3/2021 |

OTHER PUBLICATIONS

Chen, Dandan et al. "The impact of rainfall on the temporal and spatial distribution of taxi passengers", Sep. 5, 2017. Retrieved from PubMed Central: <URL: https://pmc.ncbi.nlm.nih.gov/articles/PMC5584943/>. (Year: 2017).*

International Search Report for PCT Application No. PCT/JP2021/011579, mailed on Jun. 8, 2021.

JP Office Communication for JP Application No. 2023-508141, mailed on Nov. 26, 2024 with English Translation.

* cited by examiner

| HOUR | MINUTE |
|------|--------|
| 5 | 5 |
| 6 | 5 35 |
| 7 | 5 15 25 35 45 55 |
| 8 | 5 15 25 35 45 55 |
| 9 | 5 25 45 |
| 10 | 5 25 45 |
| 11 | 5 25 45 |
| 12 | 5 25 45 |
| 13 | 5 25 45 |
| 14 | 5 25 45 |
| 15 | 5 25 45 |
| .. | .. |

TO STATION A
(FROM STATION B)

| HOUR | MINUTE |
|---|---|
| 5 | 5 |
| 6 | 5 35 |
| 7 | 5 15 25 35 45 55 |
| 8 | 5 15 25 35 45 55 |
| 9 | 5 25 45 |
| 10 | 5 25 45 |
| 11 | 5 25 45 |
| 12 | 5 25 45 |
| 13 | 5 25 45 |
| 14 | 5 25 45 |
| 15 | 5 25 45 |
| : | : |

TO STATION B
(FROM STATION A)

| HOUR | MINUTE |
|---|---|
| 5 | 15 |
| 6 | 15 45 |
| 7 | 00 10 20 30 40 50 |
| 8 | 00 10 20 30 40 50 |
| 9 | 10 30 50 |
| 10 | 10 30 50 |
| 11 | 10 30 50 |
| 12 | 10 30 50 |
| 13 | 10 30 50 |
| 14 | 10 30 50 |
| 15 | 10 30 50 |
| : | : |

INFORMATION PROVIDING SYSTEM, INFORMATION PROVIDING METHOD AND PROGRAM RECORDING MEDIUM

This application is a National Stage Entry of PCT/JP2021/011579 filed on Mar. 22, 2021, the contents of all of which are incorporated herein by reference, in their entirety.

FIELD

The present invention relates to an information providing system, an information providing method and a program recording medium.

BACKGROUND

Patent Literature 1 (PTL 1) discloses an identical person verification system, in which, in order to optimally dispatch a taxi, verification of whether or not a person determined as a potential customer is identical with a person who actually boarded a taxi is made more efficient. In addition, PTL 1 exemplifies a customer having a high possibility of boarding a taxi by, for example, a person raising his hand or a person performing a peeking action, etc. (paragraph 0043). In addition, paragraph 0045 of PTL 1 discloses that, if the person raising his hand has a higher possibility of boarding a taxi than the person performing a peeking action, a boarding probability of the person raising his hand is set at a higher value.

PTL 1: JP Tokkai Publication No. 2016-218895A

SUMMARY

The following analysis is provided by the present inventors. In order to dispatch a taxi and the like more efficiently, it is required to improve determination accuracy of the potential customer. However, further improvement is difficult by using only image obtained from a camera.

It is a purpose of the present invention to provide an information providing system, an information providing method and a program recording medium which may provide more accurate information about what type of transportation a person captured by a camera (evaluation target person) will choose.

According to a first aspect, there is provided an information providing system, comprising: detection means for detecting an evaluation target person who is a potential user of a public transportation based on image input from a camera; evaluation means for calculating at least one of a first evaluation value indicating a possibility of use of public transportation by the evaluation target person and a second evaluation value indicating a possibility of use of an alternative transportation by the evaluation target person based on a timetable of a public transportation geographically nearest to a current location of the evaluation target person; and transmission means for transmitting at least one of the first evaluation value and the second evaluation value to a predetermined terminal apparatus. [Note: the term "at least one of A and B" used herein represents [A or B or (A+B)]]

According to a second aspect, there is provided an information providing method, wherein an information providing system detects an evaluation target person who is a potential user of a public transportation based on an image input from a camera; calculates at least one of a first evaluation value indicating a possibility of use of a public transportation by the evaluation target person and a second evaluation value indicating a possibility of use of an alternative transportation by the evaluation target person based on a timetable of a public transportation geographically nearest to a current location of the evaluation target person; and transmits at least one of the first evaluation value and the second evaluation value to a predetermined terminal apparatus. The method is linked to a specific machine as an information providing system that analyses an evaluation target person based on image input from a camera.

According to a third aspect, there is provided a computer program (hereinafter, referred to as program) for realizing functions of the control apparatus. Herein, the computer program is input to a computer apparatus from an input apparatus or an external device via a communication interface, stored in a storage apparatus, and drives a processor according to predetermined steps or processes. In addition, the program may display a process result including an intermediate state step by step via a display apparatus, as necessary, or communicate with an external device via the communication interface. A computer apparatus for this purpose, as an example, comprises a processor, a storage device, an input device, a communication interface and display device, as necessary, which may be typically connected one another by a bus. Further, the program may be stored in a computer readable (non transitory) storage medium. That is, the present invention may be realized as a computer program product.

By the present invention, more accurate information about what type of transportation a person captured by a camera (evaluation target person) will choose is provided.

BRIEF DESCRIPTION OF THE DRAWINGS

FIG. 3 is a diagram showing an example of a timetable referenced by the information providing system of the first exemplary embodiment of the present invention.

FIG. 4 is a diagram showing a further example of the timetable referenced by the information providing system of the first exemplary embodiment of the present invention.

EXAMPLE EMBODIMENTS

Figure 1:
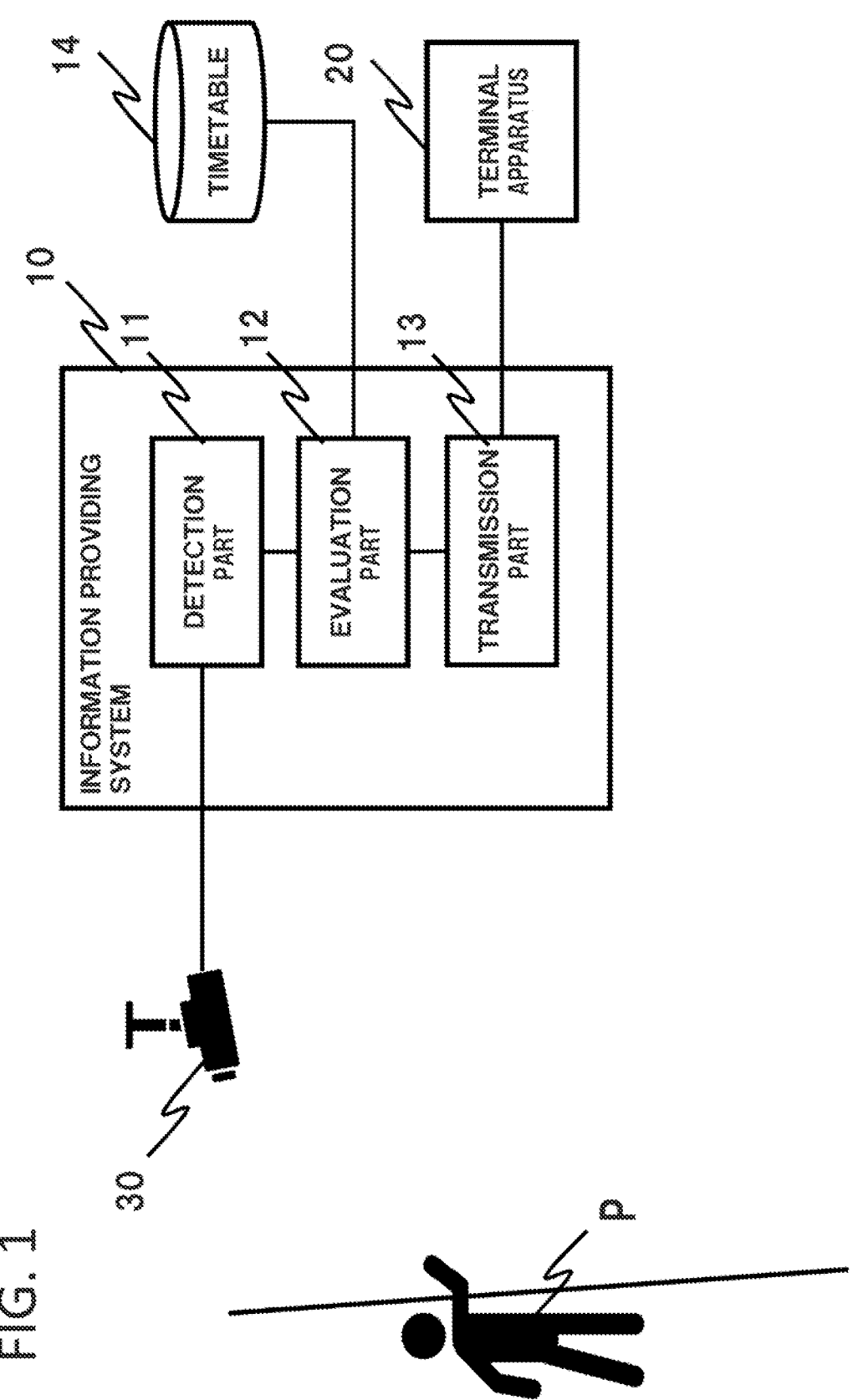
FIG. 1 is a diagram showing a configuration of one exemplary embodiment of the present invention.

First, an outline of one exemplary embodiment of the present invention is explained with reference to the drawings. Reference signs appended to the outline are expediently appended to each element as one example for a purpose of easy understanding, thus are not intended to limit the present invention to an illustrated mode. In addition, connection lines between blocks in drawings and the like, made reference in the following explanation, include both of bidirectional and one directional. One way arrow schematically indicates a flow of main signal (data), thus does not exclude bidirectional. In addition, input/output connection points of each block in the drawings have ports or interface, although omitted in the drawings. A program is executed via a computer apparatus, and the computer apparatus comprises, for example, a processor, a storage device, an input device, a communication interface and a display device, as necessary. Further, the computer apparatus is configured in a manner capable of communicating with an internal equipment or an external equipment (including a computer) via the communication interface, irrespective of a cable communication or a radio communication. In addition, input/output connection points of each block in the drawings have ports or interface, although omitted in the drawings.

The present invention in one exemplary embodiment may be realized by an information providing system 10 which comprises a detection part 11, an evaluation part 12 and a transmission part 13 as illustrated in FIG. 1.

More concretely, the detection part 11 detects an evaluation target person P who is a potential user of a public transportation based on image input from a camera 30.

The evaluation part 12 calculates at least one of a first evaluation value and a second evaluation value based on a timetable 14 of a public transportation geographically nearest to a current location of the evaluation target person P. Herein, the first evaluation value is an evaluation value indicating a possibility of use of a public transportation by the evaluation target person P. In addition, the second evaluation value is an evaluation value indicating a possibility of use of an alternative transportation by the evaluation target person. Herein, as the timetable 14 of the public transportation geographically nearest to the current location of the evaluation target person P, a timetable of a bus stop, a railroad station or the like, which is near an installed position of the camera 30, may be used. In a case where there are multiple cameras 30, a timetable of a bus stop, a railroad station or the like, which is based on the position of each of the cameras 30 may be preliminary selected.

The first evaluation value indicating the possibility of use of a public transportation by the evaluation target person P may be calculated based on, for example, a time period until an arrival time of a next vehicle of the public transportation, which is indicated in the timetable 14. For example, in a case where the time period until the arrival time of the next vehicle of the public transportation is comparatively short, the first evaluation value is calculated so that is becomes a high value.

On the other hand, the second evaluation value is a possibility of use of an alternative transportation by the evaluation target person, thus a higher value would be adopted if the first evaluation value is lower, and a lower value would be adopted if the first evaluation value is higher. In addition, in a case where the first evaluation value is represented by a probability p, the second evaluation value is a value equivalent to $(1-p)$ or less (not necessarily $(1-p)$, because there may be further alternative transportation options).

The transmission part 13 transmits at least one of the first evaluation value and the second evaluation value to a predetermined terminal apparatus 20.

As described above, the information providing system 10 of the present exemplary embodiment provides the predetermined terminal apparatus with at least one of the first evaluation value and the second evaluation value. Thereby, a user of the predetermined terminal apparatus 20 may obtain information whether or not the evaluation target person P becomes a potential customer. For example, in a case that the user of the predetermined terminal apparatus 20 is a taxi company, it is possible to determine whether or not a dispatch instruction should be provided to a taxi locating near the evaluation target person P. In addition, the user of the predetermined terminal apparatus 20 may be a general traveler and the like. In such case, the general traveler and the like may obtain, with respect to an intended destination, information about a trend of transportation means to be used by the evaluation target person P, locating near him.

First Exemplary Embodiment

Figure 2:
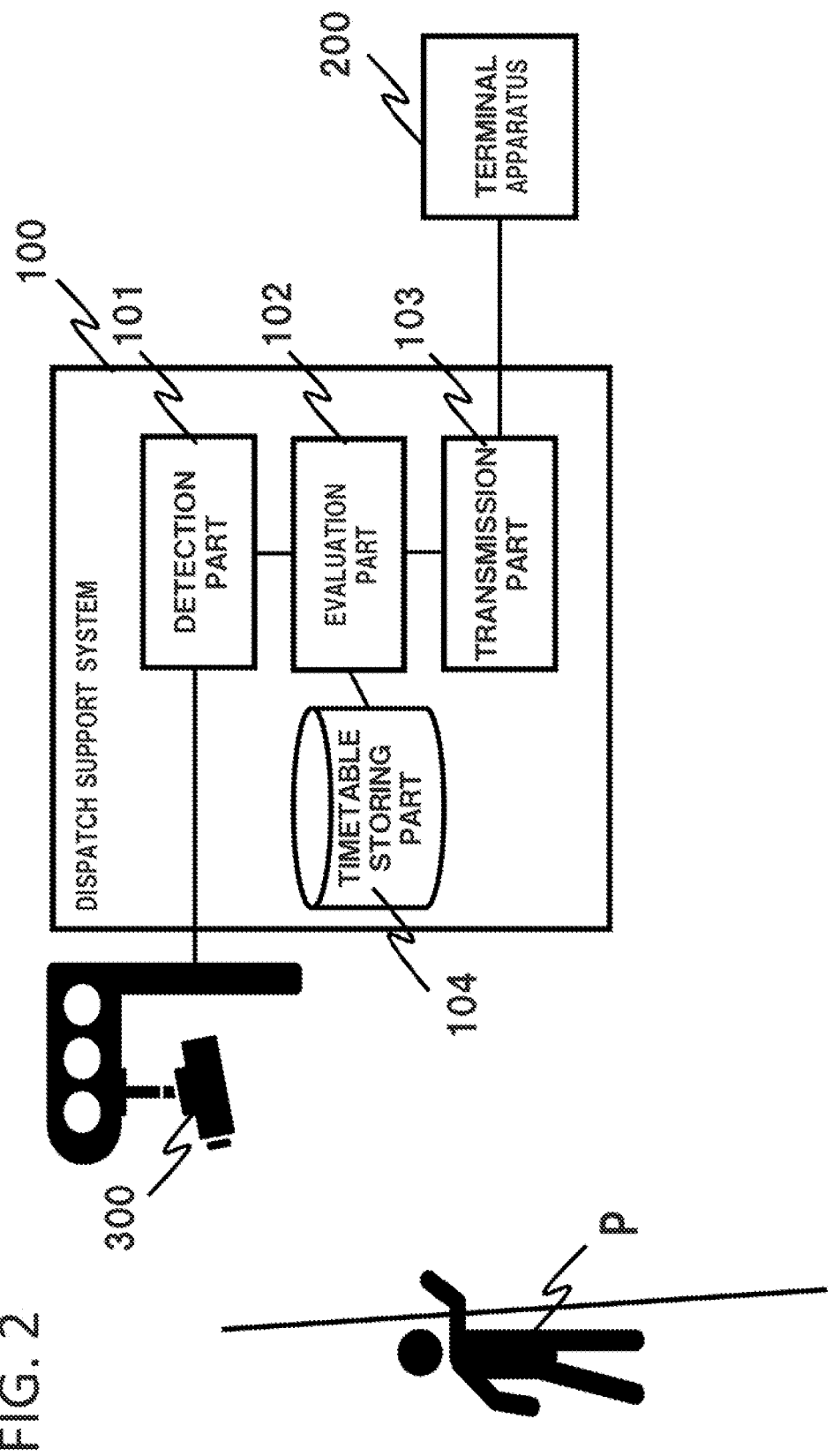
FIG. 2 is a diagram showing a configuration of an information providing system of a first exemplary embodiment of the present invention.

Next, a first exemplary embodiment of the present invention is explained in detail with reference to the drawings. FIG. 2 is a diagram showing a configuration in which the present invention is applied to a dispatch support system that dispatches a taxicab vehicle, such as a taxi, a hired car, etc. (including an automatic drive car). FIG. 2 shows a dispatch support system 100, which is connected to a camera 300 and comprises a detection part 101, an evaluation part 102, a transmission part 103 and a timetable storing part 104.

As the camera 300, a camera installed at a transportation infrastructure, such as a traffic signal machine and the like, a bus stop, a taxi stand, etc. may be used.

The detection part 101 detects an evaluation target person P who is a potential user of a public transportation based on image input from the camera 300. A technology of detecting person area from image may be used for the detection of the evaluation target person P.

When the evaluation target person P is detected, the evaluation part 102 selects from the timetable storing part 104 a timetable of a public transportation geographically nearest to a current location of the evaluation target person P. In addition, the evaluation part 102 makes reference to a selected timetable and calculates a first evaluation value indicating a possibility of use of a public transportation by the evaluation target person P and a second evaluation value indicating a possibility of use of an alternative transportation by the evaluation target person P.

FIG. 3 is a diagram showing an example of timetable stored in the timetable storing part 104. The first evaluation value may be calculated based on a length of time until an arrival time of a next vehicle in the timetable. For example, in a case where a current time is AM 5:10, the length of time until an arrival time of a next vehicle (i.e., AM 6:05) is 55 minutes. In such case, a possibility of use of the public transportation by the evaluation target person P becomes lower and a possibility of use of an alternative transportation becomes higher. On the other hand, in a case where a current time is AM 6:00, a length of time until an arrival time of a next vehicle (i.e., AM 6:05) is 5 minutes. In such case, the possibility of use of the public transportation by the evaluation target person P becomes higher and the possibility of use of an alternative transportation becomes lower. For example, in the case of a current time AM 5:10, $(60-55)/60=8.3\%$ may be the first evaluation value. In the case of a current time AM 6:00, $(60-5)/60=91.6\%$ may be the first evaluation value.

Herein, upon selecting the timetable, a travel classification of a road lane where the evaluation target person P is positioned may be taken into consideration. For example, in a case where a road lane where the evaluation target person P is positioned is a lane of a bus route bound for station B, a right side timetable in FIG. 4 is selected so that the first evaluation value becomes more accurate. Similarly, in a case where a road lane where the evaluation target person P is positioned is a lane of a bus route bound for station A, a left side timetable in FIG. 4 is selected so that the first evaluation value becomes more accurate.

On the other hand, the second evaluation value indicating the possibility of use of an alternative transportation by the evaluation target person P has a higher value if the first evaluation value is lower, and a lower value if the first evaluation value is higher. Simply, in a case where the first evaluation value is represented by a probability p, the second evaluation value is calculated as (1-p). In addition, at that time, behavior or movement of the evaluation target person P, prospected age of the evaluation target person P, size of bags of the evaluation target person P may be taken into consideration.

For example, in a case where the evaluation target person P makes actions, such as raising his hand directed to a road, peeping a road, and the like, a possibility that the evaluation target person P selects a taxi as an alternative transportation becomes higher. In such case, a predetermined score may be added to the second evaluation value.

Similarly, for example, in a case where the evaluation target person P is an old age person and a case where the evaluation target person P has a big bag, the possibility that he selects a taxi as the alternative transportation becomes higher. In these cases, the predetermined score may be added to the second evaluation value, too.

The transmission part 103 transmits at least one or both of the so-calculated first, second evaluation values to a terminal apparatus 200 of a taxi company.

Figure 5:
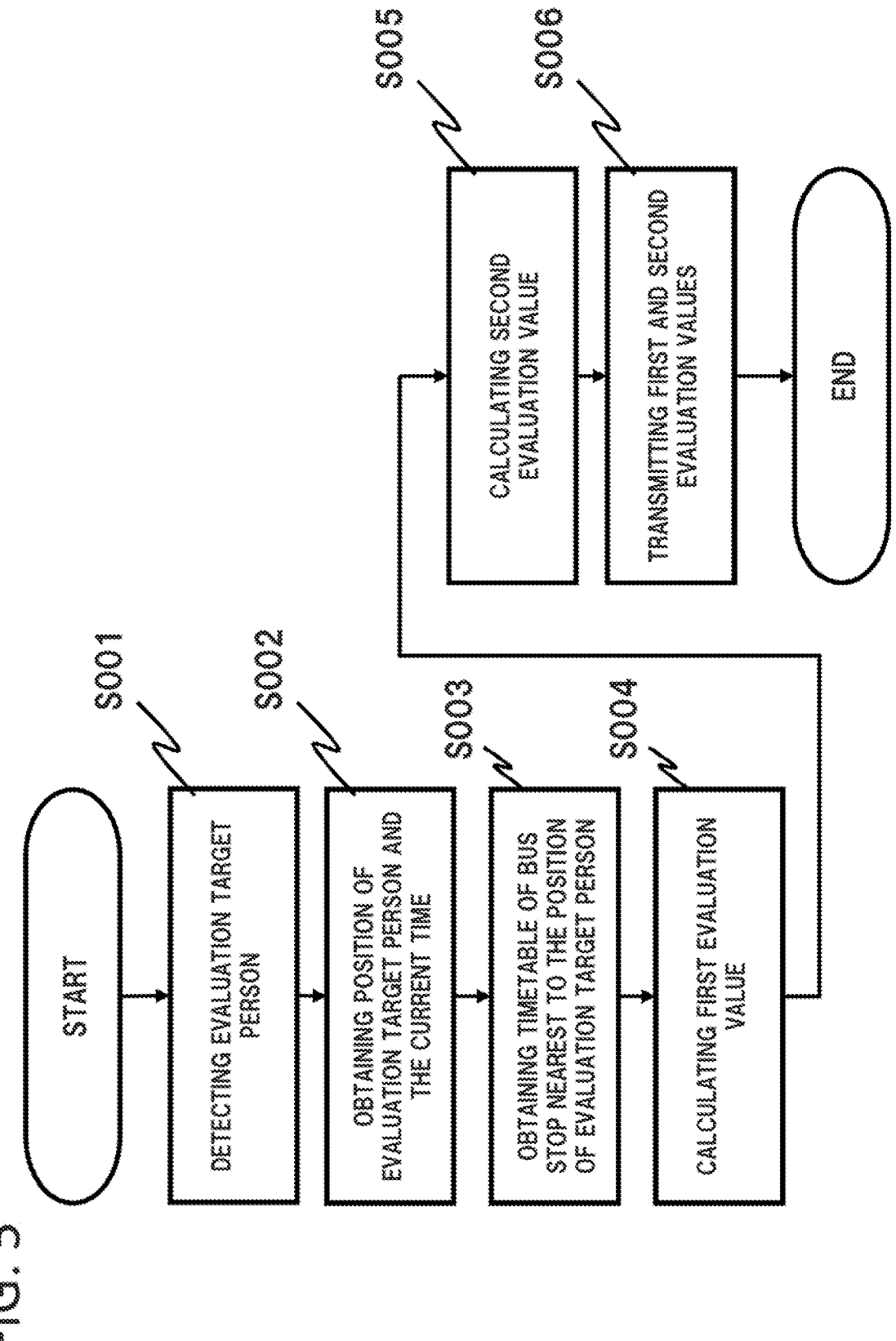
FIG. 5 is a flow diagram indicating a flow of operations by the information providing system of the first exemplary embodiment of the present invention.

Next, operations in the present exemplary embodiment are explained in detail with reference to the drawings. FIG. 5 is a flow diagram indicating operations by the dispatch support system 100 of the first exemplary embodiment of the present invention. As indicated in FIG. 5, first, the dispatch support system 100 detects the evaluation target person P who is a potential user of a public transportation from image captured by the camera 300 (Step S001). Herein, as a detection method of the evaluation target person P who is a potential user of a public transportation, a method may be used, in which a determination is performed from motion, prospected age, the presence or absence of bags or the like in a person image captured by the camera 300.

The dispatch support system 100 obtains the position of the evaluation target person P and the current time (Step S002). Herein, as the position of the evaluation target person P, the position where the camera 300 is set may be used. Of course, a detail position may be calculated from the position of the evaluation target person P in the image captured by the camera 300.

Next, the dispatch support system 100 obtains a timetable of a bus stop nearest to the position of the evaluation target person P from the timetable storing part 104 (Step S003). For example, data of such timetable may be stored in the timetable storing part 104 by preparing the timetable of the bus stop near the camera 300.

Next, the dispatch support system 100 makes reference to the obtained timetable of the bus stop so as to calculate the length of time until an arrival time of a next bus of a case where the evaluation target person P uses a bus. Further, the dispatch support system 100 calculates the first evaluation value indicating the possibility of use of a bus by the evaluation target person P based on the calculated length of time until the arrival time of the next bus (Step S004).

Next, the dispatch support system 100 calculates the second evaluation value indicating the possibility of use of an alternative transportation by the evaluation target person P (Step S005).

Finally, the dispatch support system 100 transmits the calculated first evaluation value and the second evaluation value to the terminal apparatus 200 of the taxi company (Step S006).

The taxi company determines whether or not to dispatch an available cab to the evaluation target person P using the first evaluation value and the second evaluation value. For example, in a case where the first evaluation value is higher than a predetermined threshold (first threshold), it can be said that the evaluation target person P would use a bus at a high possibility, thus the taxi company stops dispatch of a taxi. Thereby, useless dispatch may be suppressed. On the other hand, in a case where the second evaluation value higher than a predetermined threshold (second threshold), it can be said that the evaluation target person P would use a taxi, but not a bus, at a high possibility, thus the taxi company executes dispatch of a taxi.

As explained above, according to the present exemplary embodiment, the taxi company may be provided with more accurate information about what type of transportation a person captured by a camera (evaluation target person P) will choose, resulting in improvement in dispatch efficiency of the taxi company.

Second Exemplary Embodiment

Figure 6:
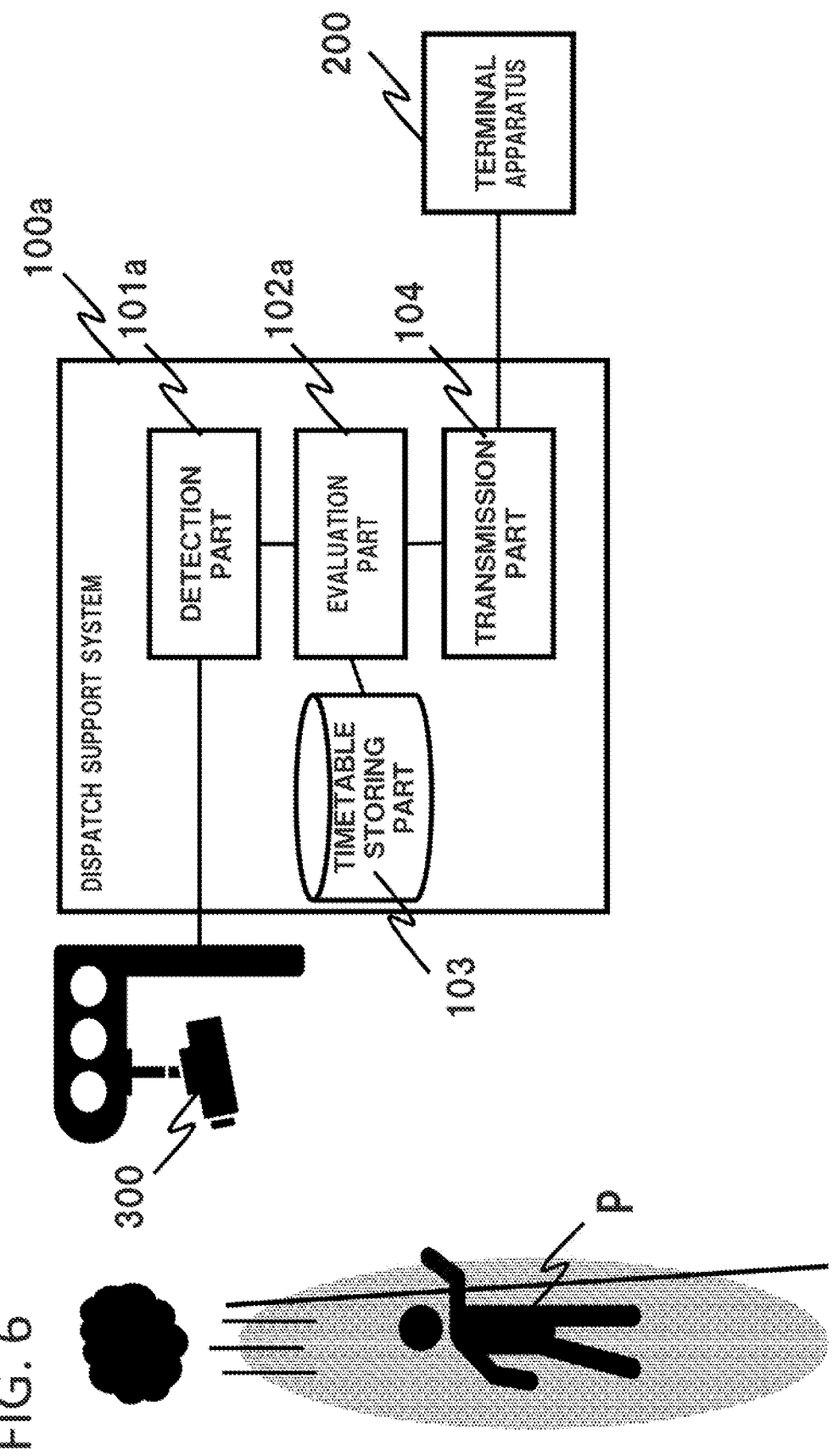
FIG. 6 is a diagram showing a configuration of an information providing system of a second exemplary embodiment of the present invention.

Next, a second exemplary embodiment of the present invention is explained, in which the accuracy of the second evaluation value may be improved by using background image of the evaluation target person P. FIG. 6 is a diagram showing a configuration of a dispatch support system 100a of the second exemplary embodiment of the present invention. There are differences from the dispatch support system 100 of the first exemplary embodiment illustrated in FIG. 2 in a point that modifications are added to functions of the detection part 101a and the evaluation part 102a. The other configurations are similar to those of the first exemplary embodiment, thus the differences are mainly explained.

The detection part 101a has a function to cut out background image of the evaluation target person P in image captured by the camera 300 and transmit it to the evaluation part 102a, in addition to a function of detecting the evaluation target person P.

The evaluation part 102a has a function to prospects the weather of the position of the evaluation target person P from the background image of the evaluation target person P and corrects the second evaluation value, in addition to a function of calculating the first, second evaluation values. More concretely, as illustrated in FIG. 6, in a case where the color of a road surface in the background image of the evaluation target person P is darker than that in a criterion image of a fine weather, the evaluation part 102a determines that it starts raining. In addition, the evaluation part 102a corrects the value of the second evaluation value indicating the possibility of use of an alternative transportation by the evaluation target person P to be increased. This is based on experiences that if it starts raining, people are more likely to take a taxi rather than a bus. Therefore, in a case where the hardness of rain and the like may be obtained from the image captured by the camera 300, an increase amount of the value of the second evaluation value may be modified.

Herein, a method for prospecting the weather of the position of the evaluation target person P from the background image of the evaluation target person P is not limited to a method using the color of the road surface as described above. For example, in a case where an umbrella in an open state appears in the image and a case where windshield wipers of a vehicle in the image are activated, it may be determined that it starts raining.

In addition, in a case where the background image is entirely brighter and a case where a shadow in the background image is darker as compared with a predetermined criterion image, it may be determined that the sunlight is strong. In a case of a high temperature and a strong sunlight, a rule of experience is established that people are more likely to take a taxi rather than a bus. Therefore, the value of the second evaluation value may be corrected to increase in such case.

Figure 7:
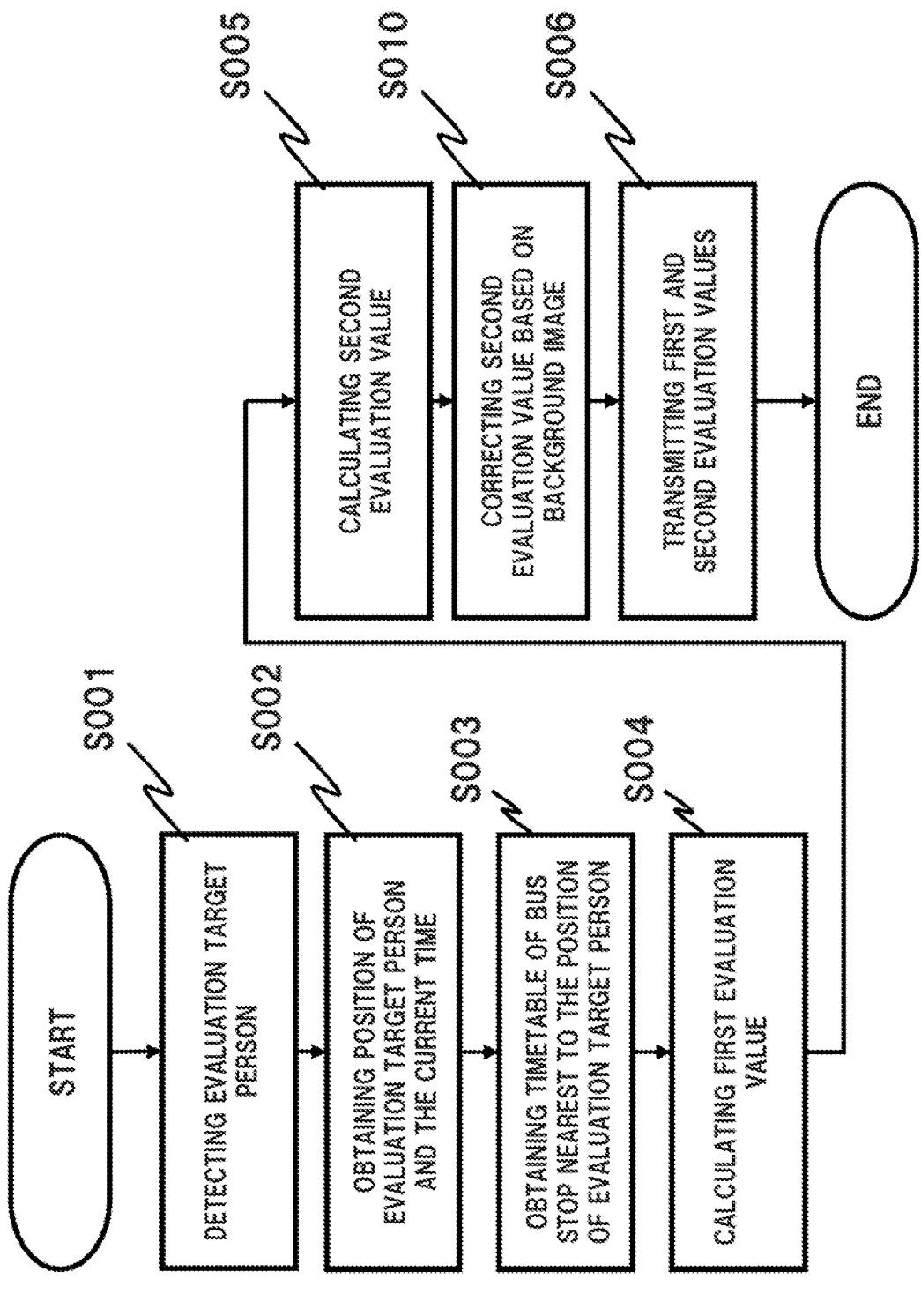
FIG. 7 is a flow diagram indicating a flow of operations by the information providing system of the second exemplary embodiment of the present invention.

Next, operations in the present exemplary embodiment are explained in detail with reference to the drawings. FIG. 7 is a flow diagram indicating a flow of operations by the dispatch support system 100a of the second exemplary embodiment of the present invention. Operations from Step S001 to S005 in FIG. 7 are the same as those of the first exemplary embodiment, thus explanation thereof is omitted.

In Steps S004, S005, when the calculation of the first and second evaluation values is completed, the dispatch support system 100a prospects the weather based on the background image of the evaluation target person P and corrects the second evaluation value (Step S010).

Finally, the dispatch support system 100a transmits the calculated first evaluation value and the corrected second evaluation value to the terminal apparatus 200 of the taxi company (Step S006).

As explained above, according to the present exemplary embodiment, in addition to an effect of the first exemplary embodiment, information of a higher accuracy in which the weather of the current location of the evaluation target person P is taken into consideration is provided, thus dispatch efficiency may be improved.

Herein, although the second exemplary embodiment has been explained so that the weather is prospected based on the background image of the evaluation target person P and the second evaluation value is corrected, the first evaluation value may be also corrected according to the content of the prospected weather, if necessary.

As described above, although each of the exemplary embodiments of the present invention has been explained, the present invention is not limited to the exemplary embodiments and further variations, substitutions and adjustments may be made to the extent that they do not depart from the basic technical concept of the present invention. For example, apparatus configuration, configuration of each element, and representation form of data illustrated in each drawing are examples to aid in understanding the present invention, and thus are not limited to the configurations illustrated in these drawings. For example, the exemplary embodiments are explained under an assumption that the public transportation is a bus and the first evaluation value is a value indicating the possibility of use of the bus by the evaluation target person P. However, the public transportation may be vehicles other than the bus. For example, the public transportation may be railroads, trams, monorails, etc.

In addition, the exemplary embodiments have been explained under an assumption that the alternative transportation of the public transportation is only taxi. However, the second evaluation value may be calculated while taking into consideration the presence of alternative transportations other than the taxi. If the number of options of the alternative transportation is increased, the second evaluation value would be reduced according to the number thereof and the possibility of use thereof. Such alternative transportations are exemplified by walking, bicycling, and a car rental system. In addition, the weather of the position of the evaluation target person P may be taken into consideration likewise as the second exemplary embodiment upon considering these options. For example, in a case of raining, the possibility of use of walking and bicycling among the alternative transportations would be low, and the possibility of use of taxi and car rental system would be high, thus the second evaluation value may be corrected while taking these items into consideration.

Further, in the exemplary embodiments, explanation has been provided so that the dispatch support systems 100, 100a comprise the timetable storing part 104. However, a configuration may be also adopted, in which the timetable is obtained from internet or the like.

Figure 8:
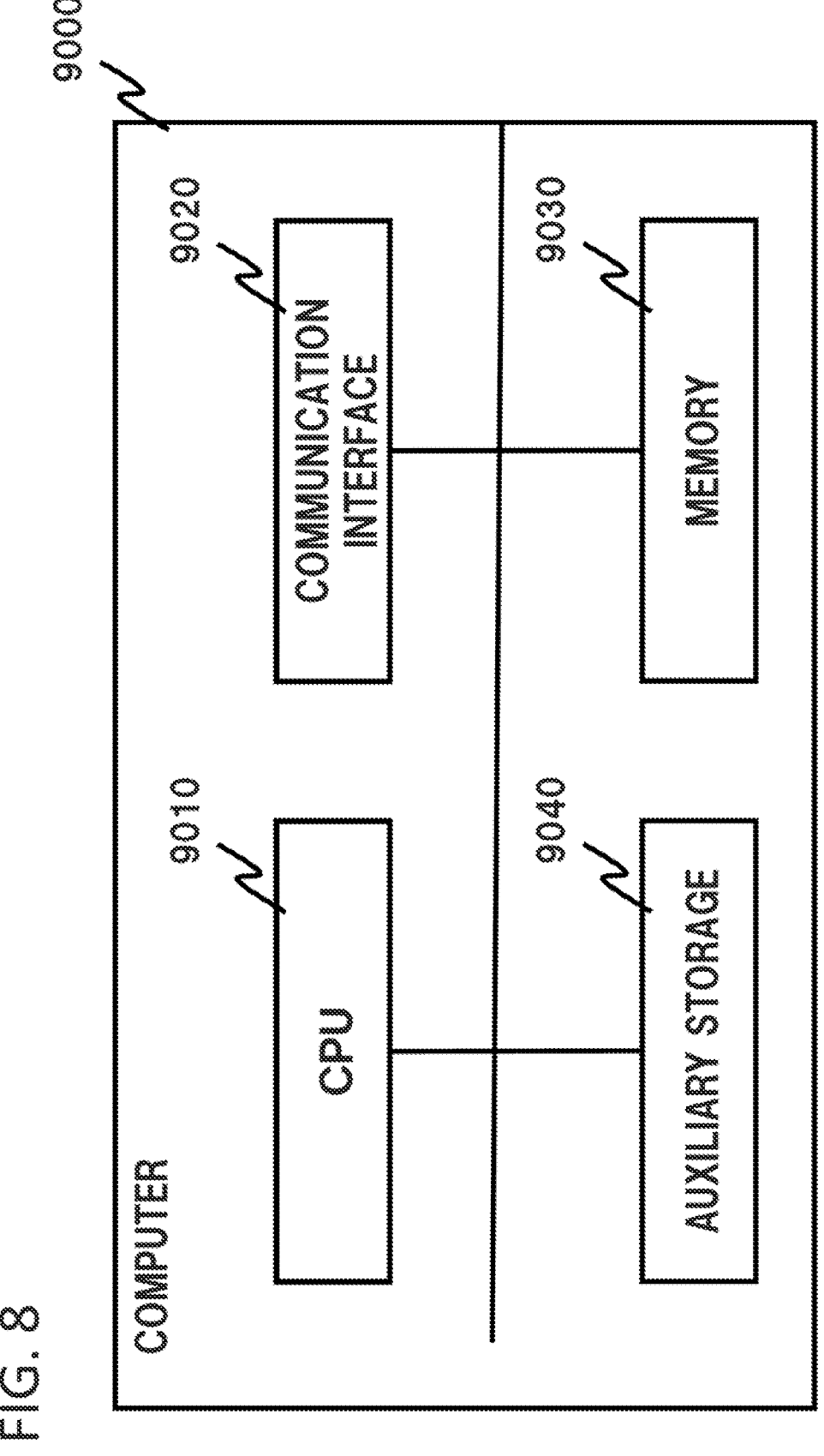
FIG. 8 is a diagram showing a configuration of a computer capable of functioning as the information providing system of the present invention.

In addition, the operations described in each of the example embodiments may be realized by a program that allows a computer (9000 in FIG. 8) to function as the dispatch support systems 100, 100a. Such computer is exemplified by a configuration in FIG. 8, that comprises a central processing unit (CPU) 9010, a communication interface 9020, a memory 9030, and an auxiliary storage 9040. That is, the CPU 9010 in FIG. 8 may execute an evaluation target person detecting program and an evaluation value calculation program.

That is, each part (processing means and functions) of the dispatch support system 100, 100a may be realized by a computer program that causes a processor mounted on the apparatuses to execute each of the above processes using its hardware.

At the last, preferable modes of the present invention are summarized.
[First Mode]
(See the information providing system according to the first aspect.)
[Second Mode]
A configuration may be adopted, in which the evaluation means of the information providing system calculates a possibility of use of the public transportation by the evaluation target person based on a length of time from a current time to an arrival time of a next vehicle of the public transportation indicated in a timetable.
[Third Mode]
A configuration may be adopted, in which where the evaluation means of the information providing system prospects weather of a location of the evaluation target person based on background image of the evaluation target person captured by the camera so as to correct the second evaluation value based on the prospected weather.
[Fourth Mode]
A configuration may be adopted, in which the evaluation means of the information providing system determines that it starts raining in a case where the color of a road surface in image captured by the camera is darker, a case where an umbrella in an open state appears in the image, or a case where windshield wipers of a vehicle in the image are activated, and corrects the second evaluation value so as to be higher.
[Fifth Mode]
A configuration may be adopted, in which the information providing system calculates the first evaluation value and the second evaluation value under an assumption that the public transportation is a bus and the alternative transportation is a taxi.
[Sixth Mode]
(See the information providing method according to the second aspect.)

[Seventh Mode]

(See the program according to the third aspect.)

Herein, the sixth to seventh modes may be developed to second to fifth modes, likewise as the first mode.

Herein, it is considered that each disclosure of the above Patent Literatures is incorporated herein by reference thereto, and the disclosures may be used as a basis or a part of the present invention as necessary. Variations and adjustments of the example embodiments and examples are possible within the ambit of the entire disclosure (including the claims) of the present disclosure and based on the basic technical concept thereof. In addition, various combinations and selections (including non-selection) of various disclosed elements (including each element in each claim, each example embodiment, each drawing, etc.) are possible within the ambit of claims of the disclosure. Namely, the present disclosure of course includes various variations and modifications that could be made by those skilled in the art according to the overall disclosure including the claims and the technical concept. In particular, the numerical range described in the present application should be interpreted as specifically describing any numerical value or subrange that falls within that range, even if not otherwise stated. Further, each of the disclosed matters of the above cited literatures is regarded as included in the described matters in the present application, if required, on the basis of the concept of the present disclosure, as a part of the present disclosure, also that a part or entire thereof is used in combination with a described matter(s) in the present application.

REFERENCE SIGNS LIST

10: information providing system
11: detection part
12: evaluation part
13: transmission part 14: timetable
20, 200: terminal apparatus
30, 300: camera
100, 100a: dispatch support system
101, 101a: detection part
102, 102a: evaluation part
103: transmission part
104: timetable storing part
9000: computer
9010: CPU
9020: communication interface
9030: memory
9040: auxiliary storage
P: evaluation target person

What is claimed is:

1. An information providing system, comprising:
at least a processor; and
a memory in circuit communication with the processor;
wherein the processor is configured to execute program instructions stored in the memory to implement:
detecting an evaluation target person who is a potential user of a public transportation based on image input from a camera,
calculating at least one of a first evaluation value indicating a possibility of use of public transportation by the evaluation target person and a second evaluation value indicating a possibility of use of an alternative transportation by the evaluation target person based on a timetable of a public transportation geographically nearest to a current location of the evaluation target person, and transmitting at least one of the first evaluation value and the second evaluation value to a predetermined terminal apparatus,
wherein the processor is further configured to:
prospect weather of a location of the evaluation target person based on a background image of the evaluation target person captured by the camera so as to correct the second evaluation value based on the prospected weather; and
dispatch an alternative transportation vehicle to the evaluation target person if the second evaluation value is above a threshold and not dispatch the alternative transportation vehicle if the first evaluation value is above a threshold.

2. The information providing system according to claim 1, wherein the processor calculates a possibility of use of the public transportation by the evaluation target person based on a length of time from a current time to an arrival time of a next vehicle of the public transportation indicated in the timetable.

3. The information providing system according to claim 1, wherein the processor determines that it starts raining in a case where the color of a road surface in image captured by the camera is darker, a case where an umbrella in an open state appears in the image, or a case where windshield wipers of a vehicle in the image are activated, and corrects the second evaluation value so as to be higher.

4. The information providing system according to claim 1, wherein the public transportation is a bus and the alternative transportation is a taxi.

5. An information providing method, wherein the method comprises:
detecting an evaluation target person who is a potential user of a public transportation based on an image input from a camera;
calculating at least one of a first evaluation value indicating a possibility of use of a public transportation by the evaluation target person and a second evaluation value indicating a possibility of use of an alternative transportation by the evaluation target person based on a timetable of a public transportation geographically nearest to a current location of the evaluation target person; and
transmitting at least one of the first evaluation value and the second evaluation value to a predetermined terminal apparatus
wherein the method further comprises:
prospecting weather of a location of the evaluation target person based on a background image of the evaluation target person captured by the camera so as to correct the second evaluation value based on the prospected weather; and
dispatching an alternative transportation vehicle to the evaluation target person if the second evaluation value is above a threshold and not dispatching the alternative transportation vehicle if the first evaluation value is above a threshold.

6. A non-transitory program recording medium, which stores program that causes a computer configuring an information providing system to execute:
detecting an evaluation target person who is a potential user of a public transportation based on image input from a camera;
calculating at least one of a first evaluation value indicating a possibility of use of a public transportation by the evaluation target person and a second evaluation value indicating a possibility of use of an alternative transportation by the evaluation target person based on a timetable of a public transportation geographically nearest to a current location of the evaluation target person;

transmitting at least one of the first evaluation value and the second evaluation value to a predetermined terminal apparatus;

prospecting weather of a location of the evaluation target person based on a background image of the evaluation target person captured by the camera so as to correct the second evaluation value based on the prospected weather; and dispatching an alternative transportation vehicle to the evaluation target person if the second evaluation value is above a threshold and not dispatching the alternative transportation vehicle if the first evaluation value is above a threshold.

7. The information providing method according to claim 5, wherein the method further comprises:

calculating a possibility of use of the public transportation by the evaluation target person based on a length of time from a current time to an arrival time of a next vehicle of the public transportation indicated in the timetable.

8. The information providing method according to claim 5, wherein the method further comprises:

determining that it starts raining in a case where the color of a road surface in image captured by the camera is darker, a case where an umbrella in an open state appears in the image, or a case where windshield wipers of a vehicle in the image are activated, and corrects the second evaluation value so as to be higher.

9. The information providing method according to claim 5, wherein the public transportation is a bus and the alternative transportation is a taxi.

10. The program recording medium according to claim 6, wherein the computer calculates a possibility of use of the public transportation by the evaluation target person based on a length of time from the current time to an arrival time of a next vehicle of the public transportation indicated in a timetable.

11. The program recording medium according to claim 6, wherein the computer determines that it starts raining in a case where the color of a road surface in image captured by the camera is darker, a case where an umbrella in an open state appears in the image, or a case where windshield wipers of a vehicle in the image are activated, and corrects the second evaluation value so as to be higher.

12. The program recording medium according to claim 6, wherein the public transportation is a bus and the alternative transportation is a taxi.

* * * * *